United States Patent
Nespo et al.

(10) Patent No.: US 6,829,925 B2
(45) Date of Patent: Dec. 14, 2004

(54) APPARATUS AND METHOD FOR MONITORING A CONDITION OF A TIRE

(75) Inventors: James J. Nespo, Mogadore, OH (US); Darrin J. Landes, Madison, WI (US); Edward J. Demor, III, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/324,402

(22) Filed: Dec. 20, 2002

(65) Prior Publication Data

US 2004/0118195 A1 Jun. 24, 2004

(51) Int. Cl.⁷ .............................................. G01L 17/02
(52) U.S. Cl. ...................................... 73/146; 73/146.8
(58) Field of Search .............................. 73/146–146.8; 340/442–444

(56) References Cited

U.S. PATENT DOCUMENTS

| | | | |
|---|---|---|---|
| 4,235,184 A | * 11/1980 | Schiavone | 116/34 R |
| 4,300,120 A | 11/1981 | Surman | 340/58 |
| 5,071,259 A | * 12/1991 | Metzger et al. | 374/143 |
| 5,977,870 A | * 11/1999 | Rensel et al. | 340/447 |
| 6,030,478 A | 2/2000 | Koch et al. | 156/123 |
| 6,217,683 B1 | 4/2001 | Balzer et al. | 156/60 |
| 6,243,007 B1 | * 6/2001 | McLaughlin et al. | 340/447 |
| 6,255,940 B1 | 7/2001 | Phelan et al. | 340/447 |
| 6,292,095 B1 | * 9/2001 | Fuller et al. | 340/442 |

* cited by examiner

Primary Examiner—Edward Lefkowitz
Assistant Examiner—Jermaine Jenkins
(74) Attorney, Agent, or Firm—Wood, Herron & Evans LLP

(57) ABSTRACT

An apparatus for monitoring the condition of a tire mounted to a vehicle wheel includes a sensor configured for installation within the interior of the tire. The sensor is secured to a wheel rim whereby prolonged exposure to liquid tire fill material is avoided, even when the wheel is oriented with the sensor at a lower-most location of the wheel rim. In one embodiment, the sensor is secured to the wheel rim by straps which extend around a circumferential surface of the rim and engage a base coupled to the sensor.

16 Claims, 2 Drawing Sheets

APPARATUS AND METHOD FOR MONITORING A CONDITION OF A TIRE

FIELD OF THE INVENTION

The present invention pertains to apparatus and methods for monitoring a condition of a tire, and more particularly to apparatus and methods for monitoring a condition of a pneumatic tire.

BACKGROUND OF THE INVENTION

In order to transport bulk materials, such as coal, iron ore and other minerals, the mining industry uses Off-The-Road (OTR) vehicles that can weigh over 600 tons when fully loaded, with the result that exceedingly high internal stresses are imposed on the tires of such vehicles in the course of their daily use. These internal stresses, which are attributable to a number of factors including driving at excessive speeds, are so destructive of such tires that it is not uncommon to have to replace the tires. On the other hand, in order to maximize the productivity of OTR vehicles, they are normally driven as fast as possible until a user perceives that the internal physical condition of any given tire is marginal. Whereupon, the operator either stops, in the case of a loss of tire pressure, or reduces the speed of the vehicle, in the case of an excessive temperature condition, to relieve the internal stresses giving rise to the marginal condition and thereby prolonging the life of the tires. Thus the speed of an OTR vehicle is controlled on the basis of the operator's perception of the condition of the tires at any given time. And, if the operator's perception is erroneous, the productivity of the vehicle is unnecessarily reduced.

Accordingly, a long-standing need of the mining industry has been to ensure that the operators of OTR vehicles are provided with accurate information concerning various conditions of the tires of such vehicles, with a view to maximizing the productivity of the vehicles.

Various attempts have been made in the prior art to meet the aforesaid need, most recently by mounting integrated circuits within each of the tires of an OTR vehicle, for detecting respective conditions related to an imminent failure of each tire and providing the OTR vehicle operators with timely information concerning such conditions. These integrated circuits have been generally referred to as "tire tags" and have been mounted to the interior surface of the tire. One such tire tag is described in U.S. Pat. No. 6,255,940, assigned to the assignee of the present invention and incorporated herein by reference in its entirety. The tag includes a patch comprising vulcanized rubber, which serves as a mounting base for attaching the tag to a tire's inner liner by cementing the patch to the inner liner.

While prior tire tags have addressed the need for providing information regarding the condition of a tire to its users, these tags suffer several drawbacks. For example, the prior tire tags require additional preparation time and effort to buff and clean an area of the inner surface of the tire where the patch will be adhered to the interior of the tire. Furthermore, the location of the tire tag on the interior surface of the tire causes the tag to be exposed to liquid tire fill which is commonly added to OTR wheels to help prevent corrosion of the wheels. This is particularly problematic when the vehicle is stopped and the wheel is in an orientation which places the tire tag at the bottom-most location of the wheel such that it is submerged beneath the liquid fill material.

There is thus a need for an apparatus for monitoring the condition of a tire which overcomes drawbacks of the prior art, such as those described above.

SUMMARY OF THE INVENTION

The present invention provides a sensor which may be readily secured within the interior of a vehicle wheel to monitor the condition of a tire mounted to the wheel rim and which avoids sustained exposure to liquid fill material which may be added within the tire. In this regard, the sensor is configured to be mounted to the wheel rim instead of an inner liner of the tire. Accordingly, the sensor does not require the preparation and cleaning associated with securing conventional tire tags to the inner liner of the tire. Advantageously, the sensor will not be submerged beneath liquid fill material which may be added to the tire, even when the wheel is oriented with the sensor positioned at a lower-most location of the rim.

In one aspect, the sensor is secured to a circumferential surface of the wheel rim by at least one strap that extends around the rim. The sensor may include a base which facilitates securing the sensor to the wheel rim. In another aspect, the base includes one or more notches configured to receive the strap.

In yet another aspect of the invention, a temperature sensing component is embedded within a casing of the sensor, near an outer surface of the sensor, and is coupled to a conductor which extends from the surface of the sensor. Advantageously, this arrangement enables the temperature sensing component to sense a temperature that is more directly related to the average air temperature of the volume of air contained within the tire cavity.

In another aspect of the invention, an instrumented wheel includes a wheel rim, a sensor configured for installation within the interior of a vehicle wheel, and securing structure configured to affix the sensor to the rim of the wheel.

In another aspect of the invention, a method of securing a tire sensor within the interior of a vehicle wheel includes positioning the sensor at a desired location on a rim of the wheel and securing the sensor to the rim.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
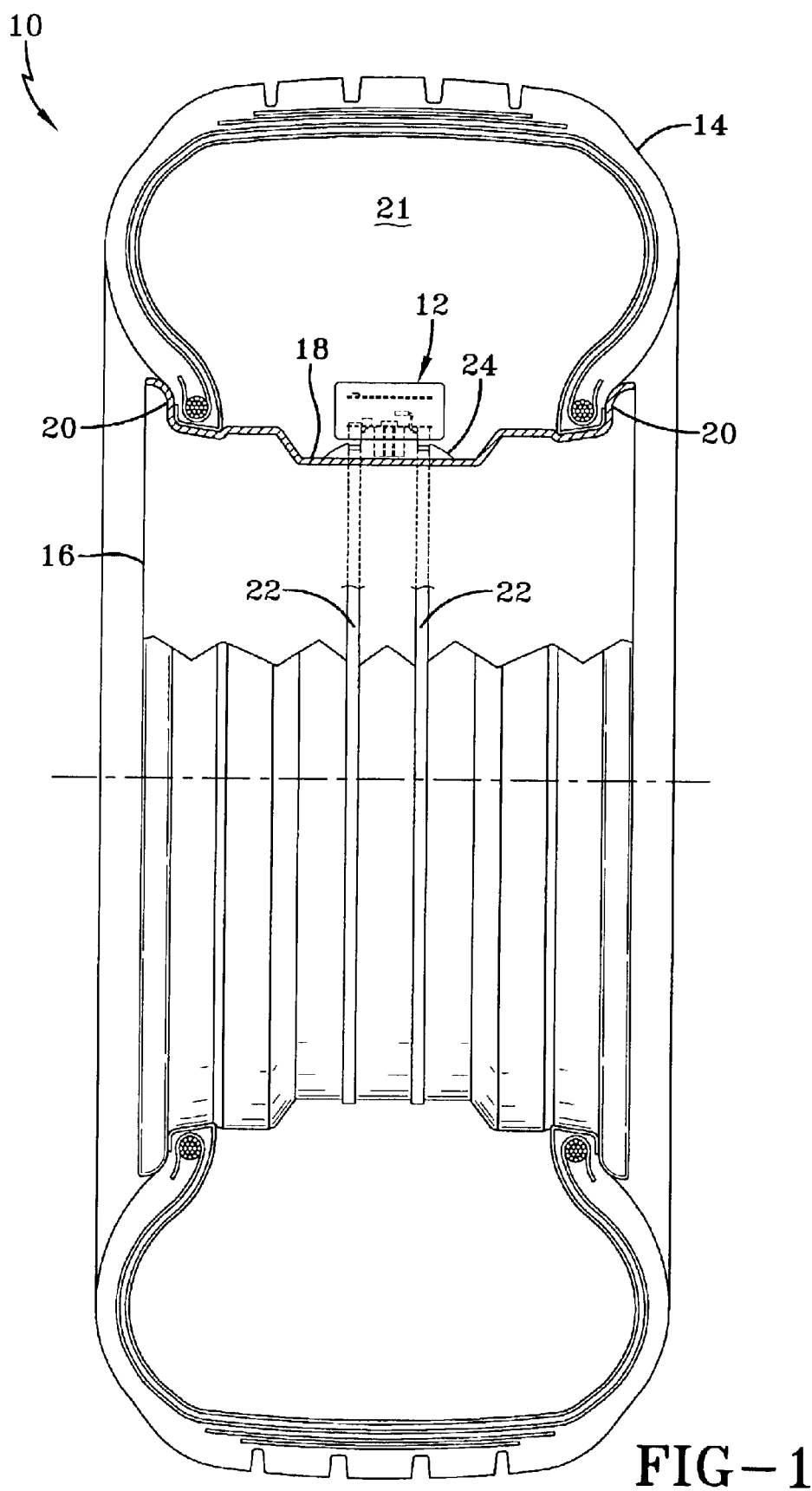
FIG. 1 is a cross-sectional view of a vehicle wheel, including a sensor mounted according to the present invention.

Referring to FIG. 1, there is shown a typical vehicle wheel 10 including a sensor or tag 12 according to the present invention. The wheel 10 includes a tire 14 coupled to a wheel rim 16 in a conventional manner. The wheel rim 16 includes a generally cylindrical wall portion 18 and side flanges 20 which engage sidewalls of the tire 14. In the exemplary embodiment shown, the sensor 12 is secured to a circumferential surface of the rim 16, proximate the cylindrical wall portion 18, such that the sensor 12 is located within an interior cavity 21 of the wheel 10. The sensor 12 is secured to the wheel rim 16 by straps 22 which extend circumferentially around the cylindrical wall portion 18 of the rim 16. The straps 22 are coupled to the sensor 12 proximate a base portion 24 of the sensor 12 and may be formed from metal, polymeric material, or other materials suitable for securing the sensor 12 to the wheel rim 16. The straps 22 are coupled together, for example, by crimping, heat sealing, R-F welding, bonding, or by any other method capable of forming a secure attachment between opposed ends of the straps 22.

Figure 2:
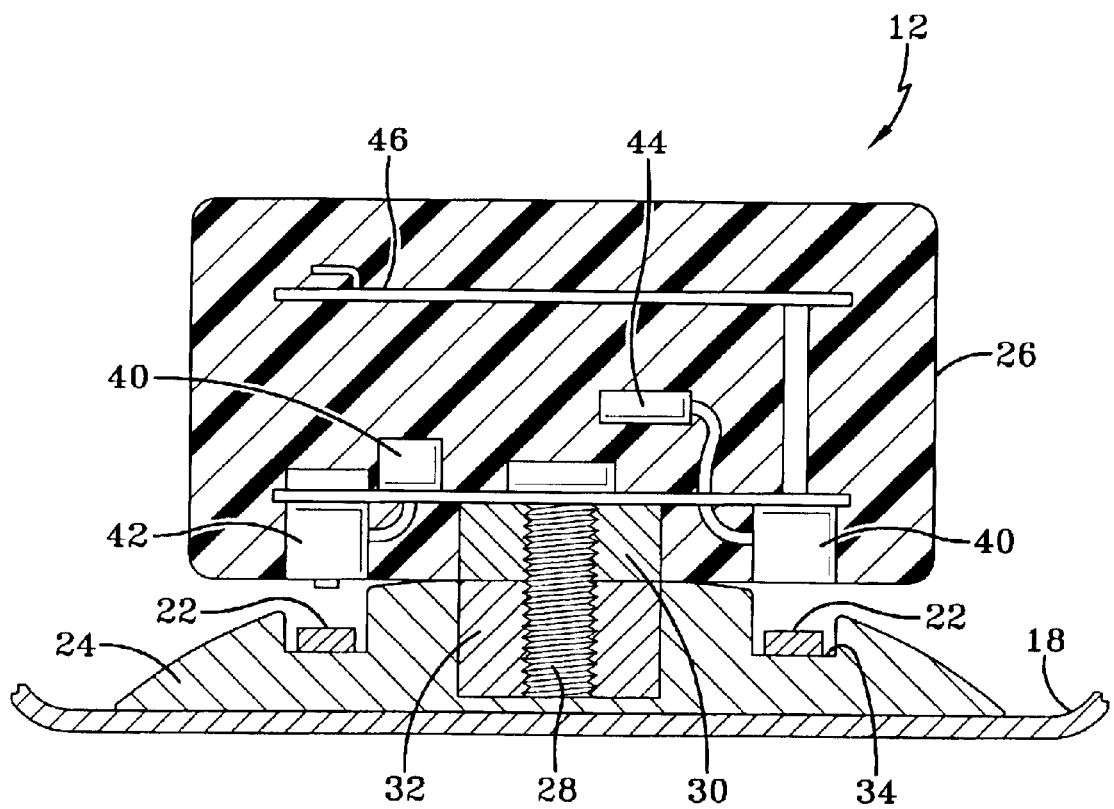
FIG. 2 is a schematic illustration of an exemplary sensor for monitoring the condition of a tire, according to the present invention.

Referring now to FIG. 2, there is shown one exemplary sensor 12, according to the present invention, for monitoring the condition of the tire 14 mounted on wheel rim 16. The sensor 12 includes a casing 26 which houses the various electronic components of the sensor 12. The casing 26 is coupled to the base 24 by a threaded fastener 28, which engages corresponding threaded inserts 30, 32 located in the casing 26 and base 24, respectively. In the exemplary embodiment shown, the base 24 includes slots 34 which are sized to receive the straps 22, whereby the sensor 12 may be secured to the wheel rim 16, as described above.

The sensor 12 is configured to monitor the interior physical environment of the tire 14 and may include various components such as temperature sensing components 40 and pressure sensing components 42, a battery 44 and a transmitter 46 for sending signals corresponding to environmental conditions sensed by the various components of the sensor 12, as more fully described in U.S. Pat. No. 6,255,940. The sensor 12 illustrated in FIG. 2 is but one exemplary embodiment of a device which may be used to monitor the condition of a tire, and it will be understood that various other configurations of sensors may be used to monitor the various parameters of the tire as may be desired. Furthermore, while the exemplary sensor has been shown herein as being secured to the cylindrical wall portion of the rim by straps 22, it will be understood that the sensor may alternatively be secured to other portions of the rim 16 and that the sensor may be secured to the wheel rim 16 by various other methods, such as by using a single strap 22 or fasteners or adhesive. The sensor 12 may be secured to the wheel rim 16 in a removable fashion, whereby the sensor 12 may easily be removed, as may be desired for replacement or installation onto a different wheel rim. Also, while the exemplary sensor 12 shown herein includes a base 24 which facilitates securing the sensor 12 to the wheel rim 16, it is contemplated that the sensor 12 may alternatively be secured to the wheel rim without a base 24.

Figure 3:
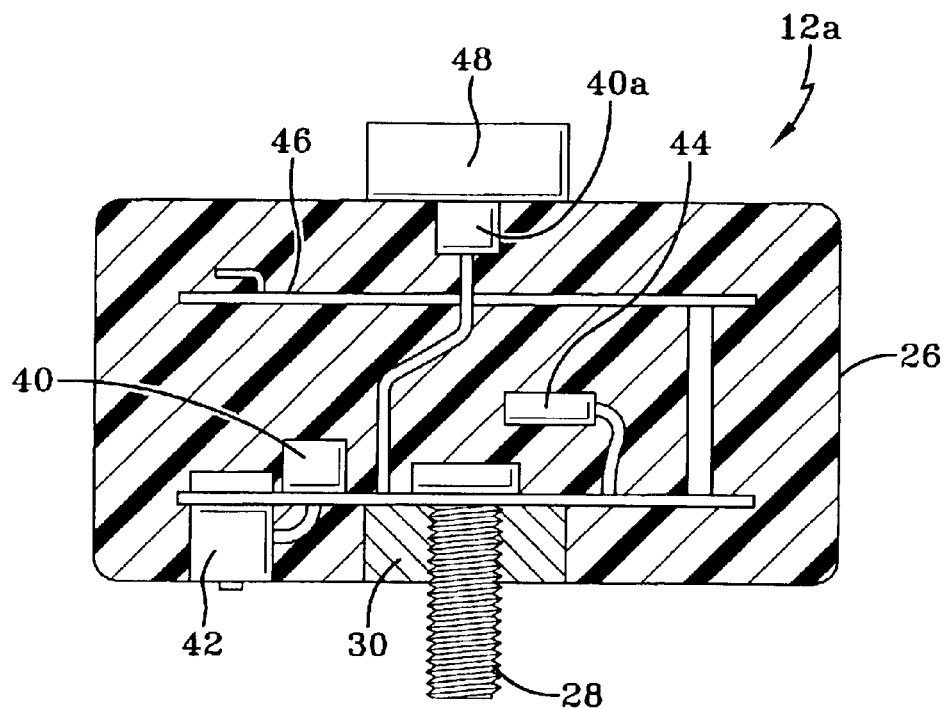
FIG. 3 is a schematic illustration depicting another exemplary sensor of the present invention.

Referring now to FIG. 3, there is shown another exemplary sensor 12a, having a temperature sensing component 40a positioned proximate an outer portion of the casing 26 and coupled to a conductor 48 which extends from the surface of the casing 26. Advantageously, the conductor 48 is directly exposed to the air contained in the interior cavity 21 of the wheel 10, whereby the temperature sensed by temperature sensing component 40a is more directly related to the average air temperature of the volume of air contained within the wheel 10. Sensor 12a also depicts an exemplary embodiment that can be secured directly to the wheel rim 16 without a base 24. In this embodiment, sensor 12a may be secured directly to wheel rim 16 by threaded fastener 28.

In another aspect of the invention, a method of securing a tire sensor 12 within the interior of a tire 14 mounted to a wheel rim 16 includes positioning the sensor 12 on the surface of wheel rim 16, and securing the sensor 12 to the wheel rim 16. In one exemplary embodiment, the step of securing the sensor 12 to the wheel rim 16 includes coupling a strap 22 about a circumferential surface of the rim 16.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An apparatus for monitoring a condition of a tire mounted to a wheel rim of a vehicle, comprising:

a sensor adapted to be installed within the interior of a tire; and securing structure couplable to said sensor and to a rim of a vehicle wheel;

whereby said sensor is located within the interior of a tire and adjacent the wheel rim when said sensor is coupled to said securing structure;

wherein said sensor includes a temperature sensing component adapted to sense a temperature of air contained within the tire; and wherein said sensor further includes a conductor operable with said temperature sensing component to improve the sensing of a temperature of air contained within the tire.

2. The apparatus of claim 1, wherein said securing structure is configured to be coupled to the vehicle wheel rim proximate a circumferential surface of the rim.

3. The apparatus of claim 1, wherein the rim includes a cylindrical wall portion and side flanges, and wherein said securing structure is configured to be coupled to the vehicle wheel rim proximate the cylindrical wall portion of the rim and intermediate the side flanges of the rim.

4. The apparatus of claim 3, wherein said securing structure comprises at least one strap configured to engage the wheel rim proximate the cylindrical wall portion.

5. The apparatus of claim 1, further comprising a base couplable to said sensor to facilitate securing said sensor to the wheel rim.

6. The apparatus of claim 5, wherein said base includes a slot configured to receive a strap for securing said sensor to the wheel rim.

7. The apparatus of claim 1, wherein said securing structure comprises a fastener configured to affix said sensor to the wheel rim.

8. The apparatus of claim 1, wherein said securing structure is configured to be removably coupled to the wheel rim.

9. An instrumented vehicle wheel, comprising:

a wheel rim;

a sensor configured to be installed within the interior of a tire coupled to said wheel rim, said sensor comprising:

a temperature sensing component adapted to sense a temperature of air contained within the tire, and a conductor operable with said temperature sensing component to improve the sensing of the temperature within the tire; and securing structure couplable to said sensor and said wheel rim and configured to affix said sensor to said wheel rim.

10. The wheel of claim 9, further comprising a tire coupled to said wheel rim.

11. The wheel of claim 9, further comprising a base couplable to said sensor to facilitate securing said sensor to said wheel rim.

12. The wheel of claim 9, wherein said securing structure comprises at least one strap configured to engage said wheel rim about a circumferential surface of said wheel rim.

13. The wheel of claim 9, wherein said securing structure is removably couplable to said wheel rim.

14. A method of sensing a temperature within the interior or a tire, comprising:

positioning the sensor at a location on a circumferential surface of the wheel rim;

securing the sensor to the wheel rim;

sensing the temperature of air within the tire with the sensor; and improving the sensed temperature with a conductor coupled to the sensor.

15. The method of claim 14, wherein the step of securing the sensor to the wheel rim includes coupling a strap about the circumferential surface of the rim.

16. The method of claim 14, wherein the step of securing the sensor to the wheel rim includes affixing the sensor to the circumferential surface of the wheel rim with a fastener.

* * * * *